United States Patent
Owsen

[11] Patent Number: 5,941,548
[45] Date of Patent: Aug. 24, 1999

[54] NON-TIPPING TRICYCLE HAVING RELEASABLE LOCKING MECHANISM BETWEEN THE FRONT AND REAR FRAMES

[76] Inventor: Peter Owsen, 18831 Bainbridge Ct., Livonia, Mich. 48152

[21] Appl. No.: 08/883,581

[22] Filed: Jun. 26, 1997

Related U.S. Application Data

[63] Continuation-in-part of application No. 08/519,826, Aug. 25, 1995, Pat. No. 5,730,453.

[51] Int. Cl.⁶ ........................................ B62K 5/04
[52] U.S. Cl. .................... 280/282; 280/266; 280/271; 280/272
[58] Field of Search ................... 280/282, 271, 280/272, 266

[56] References Cited

U.S. PATENT DOCUMENTS

| | | | |
|---|---|---|---|
| 3,698,502 | 10/1972 | Patin | 280/282 |
| 4,006,916 | 2/1977 | Patin | 280/282 |
| 4,159,752 | 7/1979 | Kanno | 280/282 |
| 4,674,761 | 6/1987 | Kassai | 280/271 |
| 4,892,323 | 1/1990 | Oxford | 280/272 |
| 5,240,267 | 8/1993 | Owsen | 280/240 |
| 5,611,555 | 3/1997 | Vidal | 280/282 |

*Primary Examiner*—Lanna Mai
*Assistant Examiner*—Avraham H. Lerner
*Attorney, Agent, or Firm*—Charles W. Chandler

[57] ABSTRACT

A tricycle has two non-steerable rear wheels connected to a rear frame structure, and a single steerable front wheel connected to a front frame structure. The front frame structure includes a horizontal tubular frame element extending underneath the rear frame structure for swingable connection to the rear frame structure, such that the front frame structure can lean away from a normal upright position centered between the rear wheels. During a turning maneuver the leaning capability is advantageous in maintaining the rear wheels in pressure contact with the road surface so as to enhance the stability of the tricycle. A manually-operated locking mechanism is provided for releasably locking the front frame structure in its normal upright centered position. The locking mechanism keeps the front frame structure in a stable mode when the person is mounting or dismounting the tricycle, and also when the tricycle is being driven at low speeds in which there is minimal danger of the tricycle tipping or overturning.

10 Claims, 5 Drawing Sheets

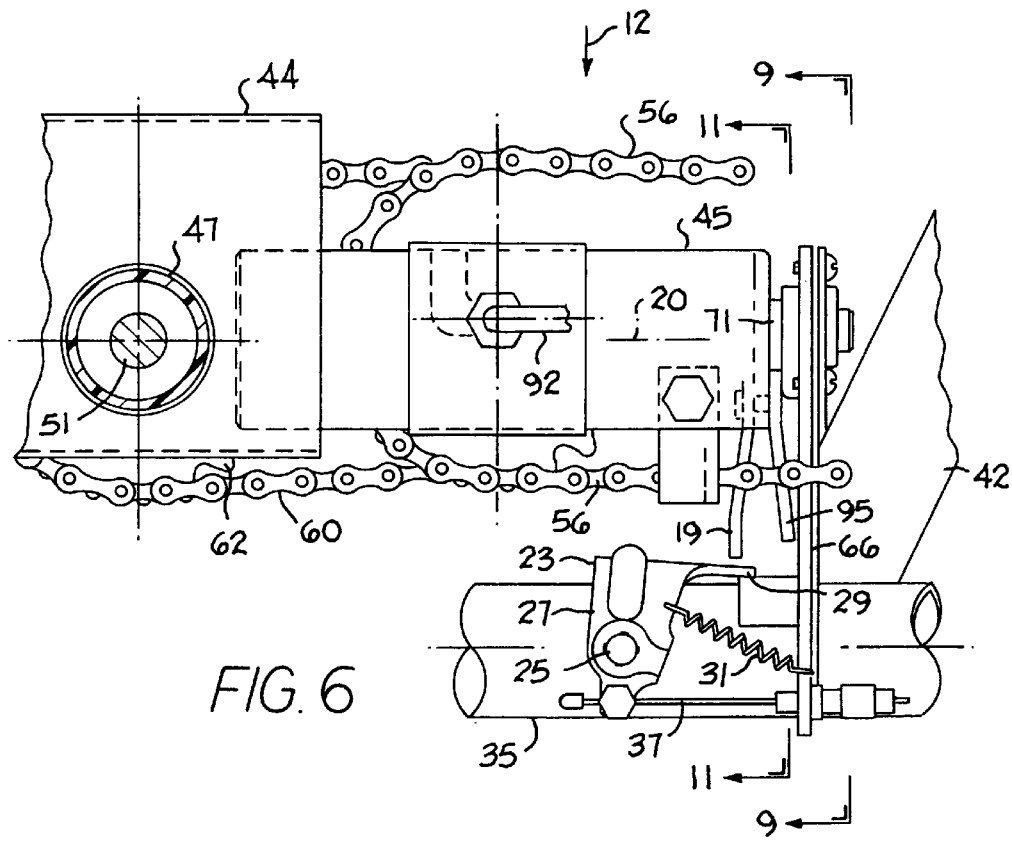
FIG. 6
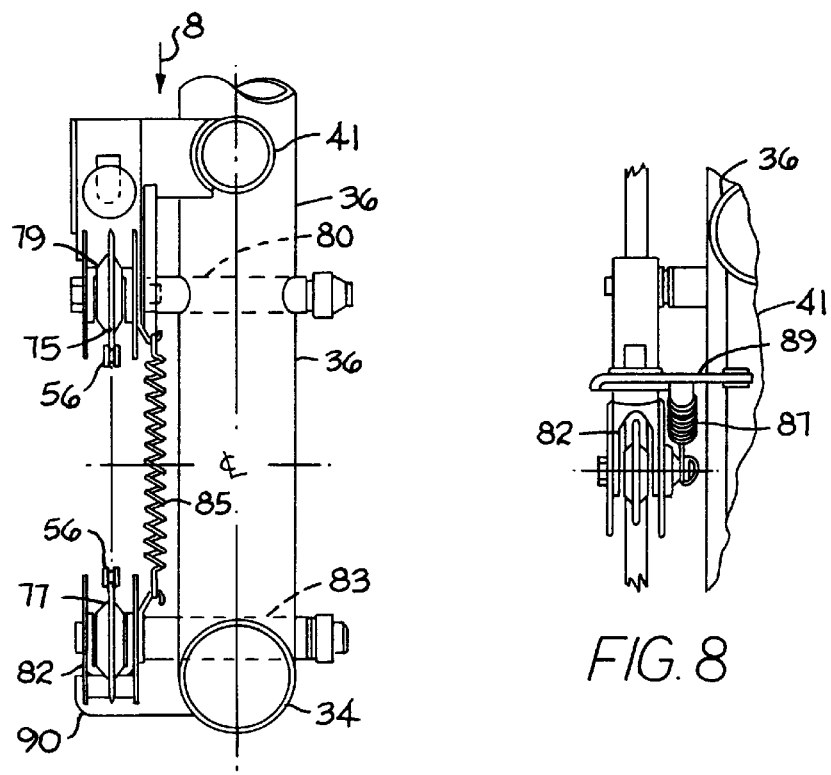
FIG. 7
FIG. 8

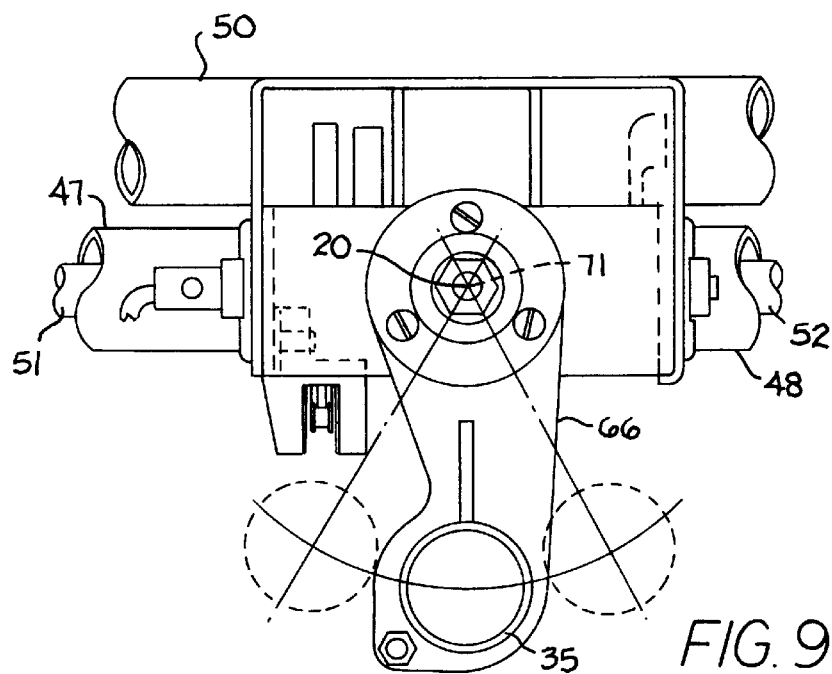
FIG. 9
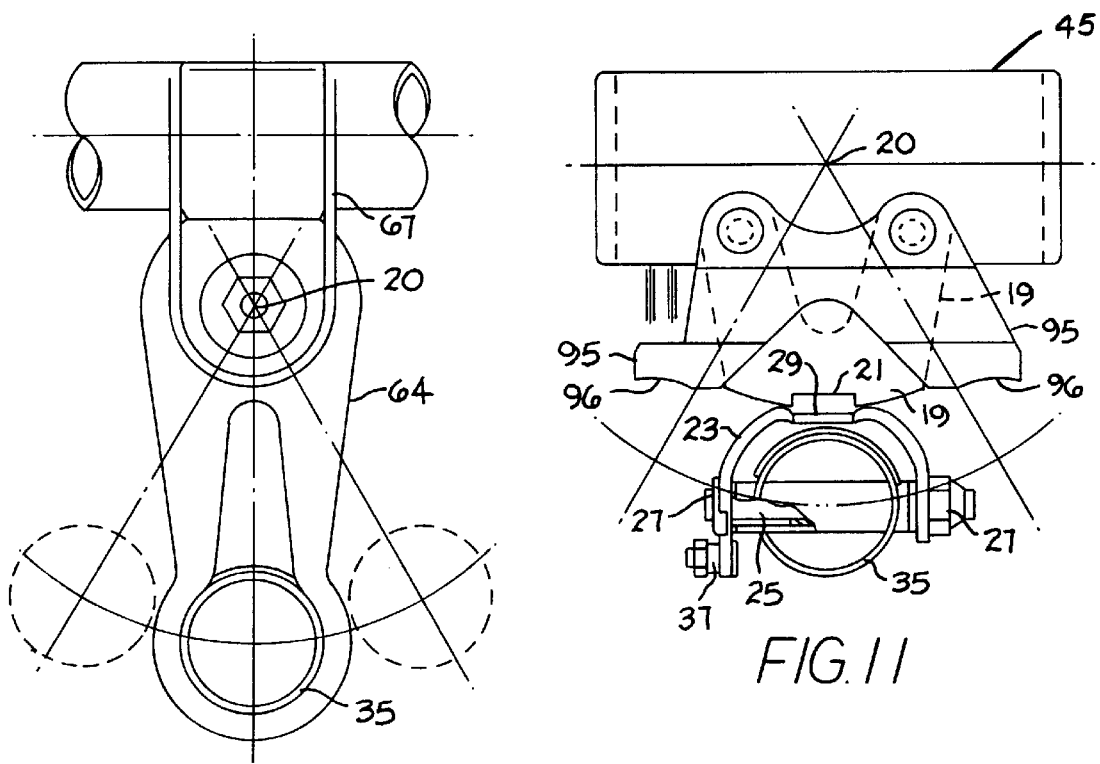
FIG. 10
FIG. 11

NON-TIPPING TRICYCLE HAVING RELEASABLE LOCKING MECHANISM BETWEEN THE FRONT AND REAR FRAMES

CROSS-REFERENCE TO RELATED APPLICATION

This application is a continuation-in-part of application Ser. No. 08/519,826, filed Aug. 25, 1995, for "Non-Tipping Tricycle" and has since issued as U.S. Pat. No. 5,730,453 on Mar. 24, 1998.

BACKGROUND OF THE INVENTION

This invention relates to a tricycle, and particularly to a tricycle having means for preventing the tricycle from tipping over during turning maneuvers, or when riding over rough terrain.

In conventional tricycles having two rear wheels and a single front wheel, the front wheel is usually steerable (or turnable) to facilitate turning maneuvers. The rider grips the front handlebars to turn the front wheel, to achieve a turning maneuver.

During a vehicle turning maneuver, the center of gravity of the rider and the tricycle tends to shift in the direction of the turn. As a result, one of the rear wheels tends to lift off the ground. In a worst case scenario, the tricycle can tip over. The rider has the perception that the tricycle is unstable.

My U.S. Pat. No. 5,240,267 discloses a tricycle that overcomes the wheel lift-off problem experienced with conventional tricycles. The tricycle shown in U.S. Pat. No. 5,240,267 comprises separate front and rear frames that have an articulated connection, whereby during a turning maneuver the rider can lean with the front frame in the direction of the turn, but the rear frame wheels remain on the ground.

My co-pending U.S. patent application Ser. No. 519,826, filed on Aug. 25, 1995, and has since issued as U.S. Pat. No. 5,730,453 on Mar. 24, 1998, discloses an improvement on the tricycle shown in U.S. Pat. No. 5,240,267. The improvement relates to a chain-sprocket drive means wherein the drive sprocket is located on the front frame and the driven sprocket is located on the rear frame, whereby the drive chain undergoes a twisting motion as the front frame tilts (or leans) from a neutral upright position. The front frame is articulated to the rear frame on a longitudinal axis that intersects the rotational axis of the drive sprocket, so as to minimize the twisting motion of the drive chain.

SUMMARY OF THE INVENTION

The present invention concerns an improvement on the invention disclosed in my co-pending patent application Ser. No. 519,826, filed on Aug. 25, 1995 and has since issued as U.S. Pat. No. 5,730,453 on Mar. 24, 1998. The present invention contemplates a manually-operated means for releasably locking the front frame in a neutral upright position. A manual lever located on the handlebars can be operated to lock the front frame in the neutral upright position, whereby the person can mount the tricycle and operate same at relatively low road speeds, without fear that the front frame will tilt or lean in an unsteady or unstable fashion.

The person can release hand pressure on the manual lever or unlock the front frame for transverse swinging motion. At relatively high road speeds, e.g. above three or four miles per hour, the front frame can swing transversely, such that the rider can lean in the direction of any turning maneuver, thereby balancing forces on the rear walls for achieving an essentially equalized grip of the rear wheels on the road surface.

The present invention achieves a relatively stable condition of the tricycle at standstill or low speed operation by locking the front frame to the rear frame. The front frame is unlocked from the rear frame to achieve a relatively stable condition at higher road speeds. The locking mechanism is controlled by the person riding the tricycle.

Features and advantages of the invention will be apparent from the attached drawings and description of a tricycle embodying the invention.

DESCRIPTION OF THE DRAWINGS

The description refers to the accompanying drawings in which like reference characters refer to like parts throughout the several views and in which:

FIG. 6 is a fragmentary side elevational view of a locking mechanism for releasably locking the front frame of the FIG. 1 tricycle to the rear frame;

FIG. 7 is a fragmentary sectional view taken on line 7—7 in FIG. 5;

FIG. 8 is a fragmentary view of the FIG. 7 mechanism taken in the direction of arrow 8 in FIG. 7;

FIG. 9 is a transverse sectional view taken essentially on line 9—9 in FIG. 6;

FIG. 10 is a fragmentary sectional view taken on line 10—10 in FIG. 1;

FIG. 11 is a transverse sectional view taken essentially on line 11—11 in FIG. 6.

DESCRIPTION OF A PREFERRED EMBODIMENT

Figure 1:
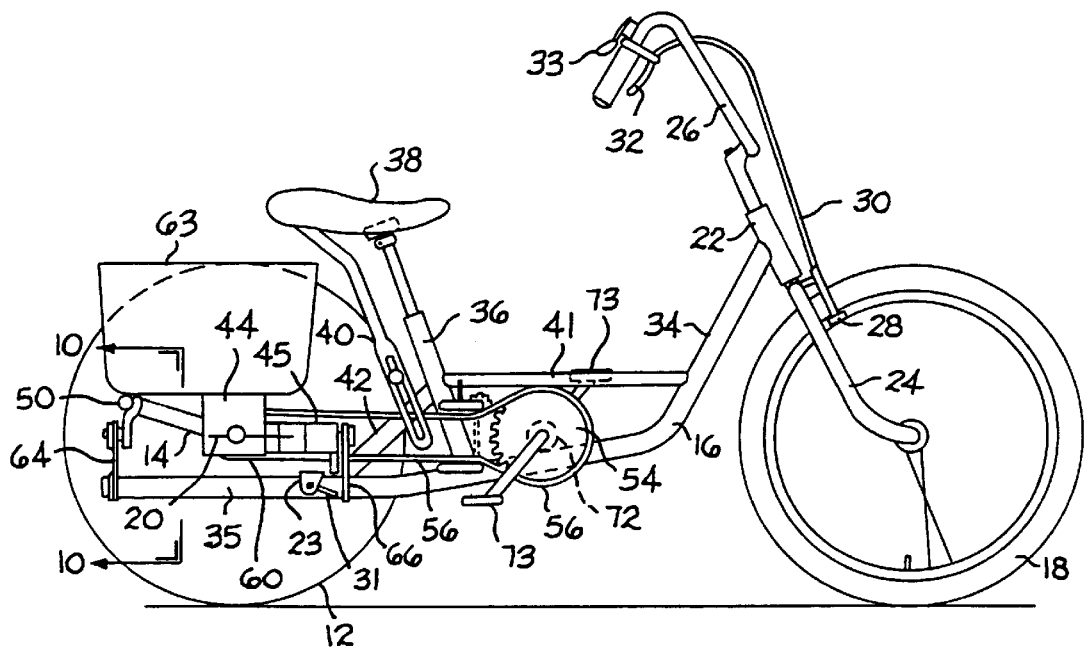
FIG. 1 is a side elevational view of a tricycle embodying the invention. One rear wheel of the tricycle is removed to better illustrate structural features.
Figure 2:
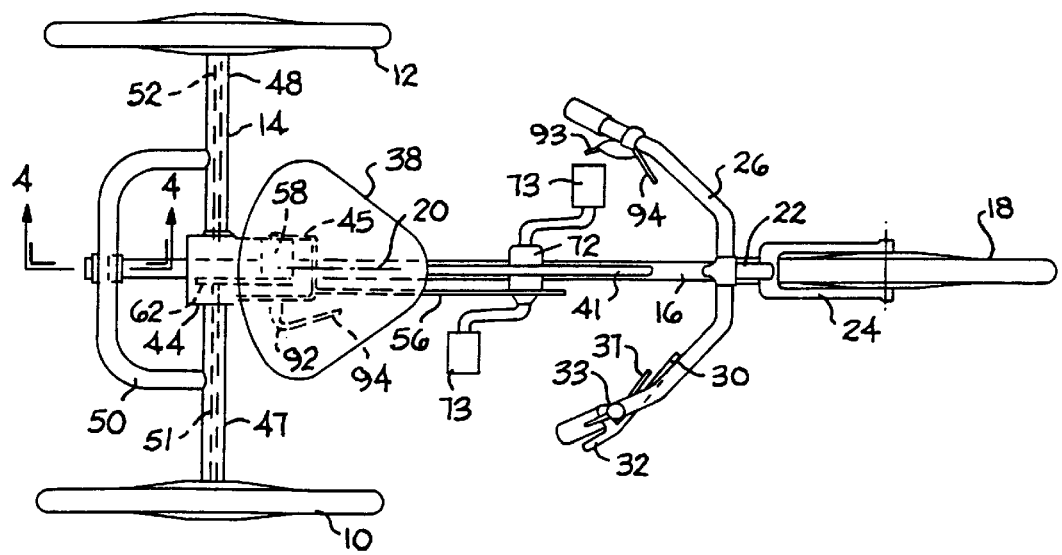
FIG. 2 is a top plan view of the FIG. 1 tricycle.

FIGS. 1 and 2 show a tricycle embodying features of the invention. The tricycle comprises two rear ground wheels 10 and 12, a rear frame structure 14 connected to the rear ground wheels, and a front frame structure 16 connected to a single front ground wheel 18.

Figure 3:
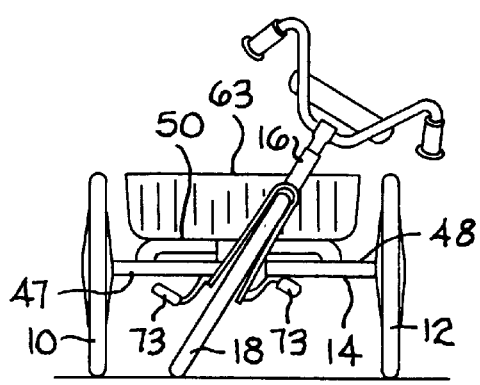
FIG. 3 is a front elevational view of the FIG. 1 tricycle, with the front frame of the tricycle tilted from a neutral upright position.

The front frame structure 16 has an articulated connection to the rear frame structure 14 whereby the front frame structure can lean to the right or to the left, as shown, e.g. in FIG. 3. This leaning capability is useful particularly during turning maneuvers, since both rear ground wheels can remain in contact with the road surface while the rider leans in the direction of turn so as to prevent possible tipping over or rocking of the tricycle due to centrifugal forces.

The articulated connection between front frame structure 16 and rear frame structure comprises a pivot mechanism defining a longitudinal pivot axis 20 located on the tricycle centerline midway between the two rear ground wheels 10 and 12. The rider can turn the tricycle to the right or to the left with the same physical effort. In either case the rear ground wheels maintain approximately the same (equalized) pressure on the road surface.

The general relationship between the front frame structure and the rear frame structure is similar to that depicted in my co-pending patent application, Ser. No. 519,826, filed on Aug. 25, 1995 and has since issued as U.S. Pat. No. 5,730,453 on Mar. 24, 1998. In both cases the tricycle has a front frame structure that can lean to the right or to the left for achieving of tricycle stability during turning maneuvers.

Front frame structure 16 comprises a head tube 22 for swivably mounting the rotary stem of a fork structure 24 that is suitably connected to the axle of the front ground wheel 18. A set of handlebars 26 is connected to the upper end of the rotary stem, such that the person riding the tricycle can steer the front wheel by turning the handlebars.

A set of friction brake pads 28 is pivotably mounted on a caliper in front of fork structure 24. Bowden wire 30 extends from the calipers to a hand lever 32 on the right handlebar, whereby the person can squeeze the hand lever to apply braking pressure to the front wheel 18.

Front frame structure 16 comprises a tubular frame element 34 that angles downwardly and rearwardly from head tube 22 so as to form a horizontal tubular frame element 35 located underneath the rear frame structure 14. Frame structure 16 further includes an upstanding tubular post structure 36 that supports the rider's seat 38. An adjustment mechanism 40 is provided behind post structure 36 for varying the inclination angle of the seat while permitting the seat to be raised or lowered on post structure 36.

Front frame structure 16 can be reinforced by means of a horizontal tubular reinforcement 41 and angled sheet steel reinforcement 42.

Rear frame structure 14 comprises a heavy sheet steel hood 44 that is open at the bottom, the front and the rear. A heavy U-shaped bar structure 45 is welded and extends forwardly from hood 44 to form a supporting cage for a sprocket and speed change mechanism constructed as shown in my co-pending patent application Ser. No. 519,826 and has since issued as U.S. Pat. No. 5,730,453 on Mar. 24, 1998.

Rear frame structure 14 also includes two tubular shaft housings 47 and 48 extending in opposite directions from the side walls of hood 44, and a U-shaped steel tube 50 having its ends welded to the shaft housings outboard from hood 44. Bearings within shaft housings 47 and 48 support elongated shafts 51 and 52 that form axles for ground wheels 10 and 12.

Ground wheel 12 is non-powered. Ground wheel 10 is powered by a chain-sprocket drive system that includes a drive sprocket 54, drive chain 56, speed change mechanism 58, driven chain 60 and sprocket 62 affixed to the inner end of shaft 51, see FIG. 9. The drive arrangement is similar to that employed in the tricycle shown in my co-pending patent application, Ser. No. 519,826 and has since issued as U.S. Pat. No. 5,730,453 on Mar. 24, 1998.

The web portion of the U-shaped steel tube 50 is at the same level as the top wall of steel hood 44, so as to form a bevel support surface for a basket 63. Bolt means, not shown, can be used to fasten the basket to hood 44 and tube 50.

Figure 4:
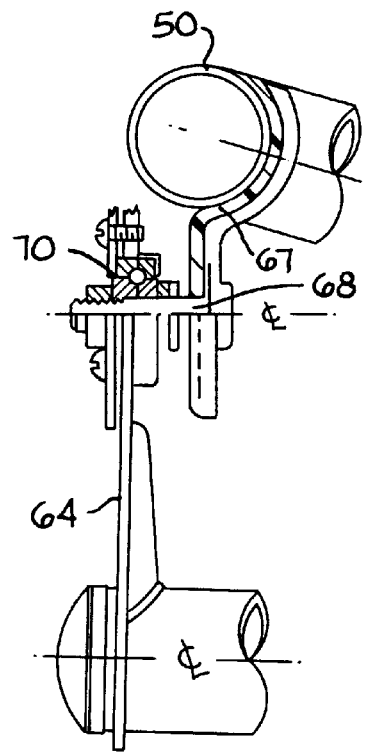
FIG. 4 is an enlarged fragmentary view of a rotary connection between the front frame and the rear frame of the FIG. 2 tricycle.
Figure 5:
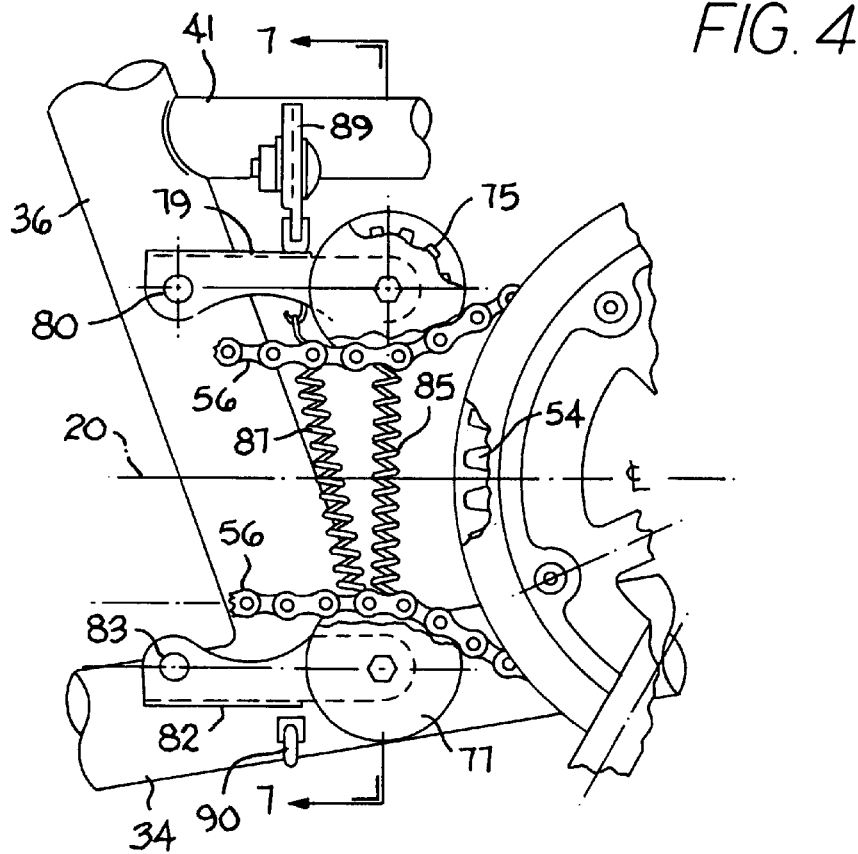
FIG. 5 is a fragmentary side elevational view of an idler sprocket mechanism used in the FIG. 1 tricycle to prevent the drive chain from becoming disconnected from the drive sprocket.

As previously noted, front frame structure 16 has an articulated connection to rear frame structure 14. The articulated connection comprises a rear suspension arm 64 (shown best in FIGS. 4 and 10) and a front suspension arm 66 (shown best in FIGS. 6 and 9); each suspension arm is rigidly affixed to tubular frame element 35. Referring to FIGS. 4 and 10, a depending bracket 67 is affixed to tube 50 of frame structure 14 to support a stub shaft means 68. Suspension arm 64, attached to horizontal tubular frame element 35, is swingable around the axis of stub shaft means 68 via an anti-friction bearing 70.

Referring to FIGS. 6 and 9, the front suspension arm 66 is swingably suspended from a stub shaft means 71 extending forwardly from the front wall of U-shaped cage 45. Preferably the swingable connection comprises an anti-friction bearing similar to the bearing shown in FIG. 4. Stub shafts 68 and 71 are located on a common pivot axis 20 that intersects the transverse rotational axis of the drive sprocket 54, for the purpose of minimizing twist of the drive chain 56 when the front frame structure is in a leaning condition (FIG. 3).

Drive sprocket 54 has a shaft extending through a hub 72 (FIG. 2) affixed to frame structure 16. Crank arms extend from the sprocket shaft to support foot pedals 73. During a turning maneuver the front frame structure will lean to the right or to the left, with a corresponding change in the plane of drive sprocket 54. This action produces a twist force on the drive chain 56. Two freely rotatable idler sprockets 75 and 77 are provided for guiding the chain so as to prevent disconnection of the chain from sprocket 54.

Idler sprocket 75 is rotatably supported on a swingable upper arm 79 having a pivotal connection 80 with frame element 36. Idler sprocket 77 is rotatably supported on a swingable lower arm 82 that has a pivotal connection 83 with frame element 34. A first tension spring 85 connects the two swingable arms 79 and 82. A second tension spring 87 connects the lower arm 82 with a stop arm 89 extending from frame element 41. Spring 85 pulls arms 79 and 82 toward one another to maintain a desired tension in drive chain 56 while permitting increases in the chain envelope associated with the chain twist phenomena. The second spring 87 effectively adjusts the arm system upwardly so that upper arm 79 is continually engaged with the adjustable stop arm 89 under most operating conditions. A lower stop 90 is mounted on frame element 34 to limit downward motion of arm 82, e.g. when the drive chain decelerates during the application of a braking force to foot pedals 73.

Figure 12:
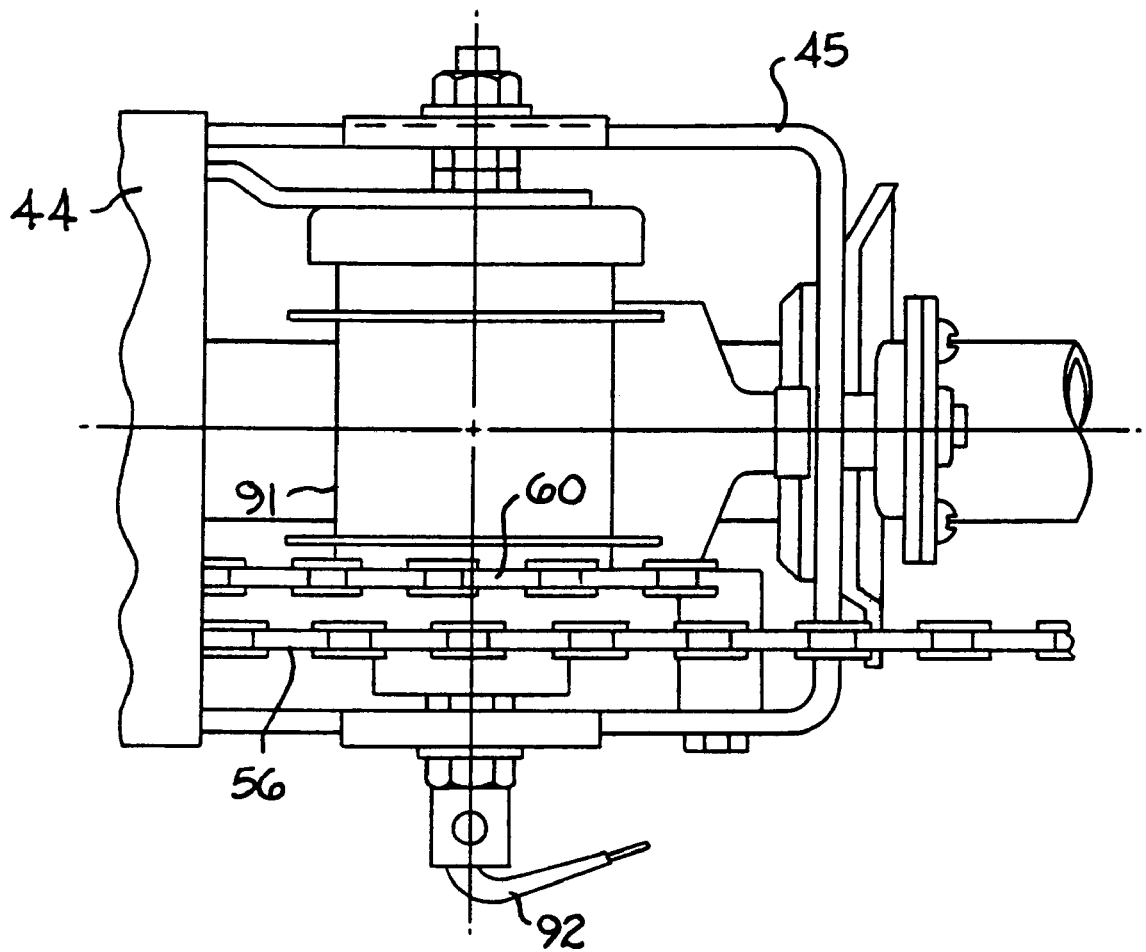
FIG. 12 is a top plan view of the FIG. 6 structure, taken in the direction of arrow 12 in FIG. 6

The speed change mechanism within cage 45 includes a speed change drum 91 (FIG. 12) having an input connection to a sprocket in mesh with drive chain 56 and an output connection to a second sprocket in mesh with a driven chain 60. A clutch system within drum 91 is operated by a pull chain 92. A lever actuator 93 on the left handlebar (FIG. 2) is connected to pull chain 92 by a Bowden wire 94, to achieve selected speed ratios of the two chains 56 and 60.

FIGS. 9, 10 and 11 illustrate with dashed lines the permissible limits of swinging motion of horizontal tubular frame element 35 associated with the leaning movement of front frame structure 16. A bracket 95 attached to cage 45 has stop surfaces 96 that limit the swinging motion of horizontal tubular frame element 35.

The present invention is more particularly related to a manually-operated means for releasably locking the front frame structure 16 in a neutral upright position wherein the horizontal frame element 35 is located directly below the horizontal suspension (pivot) axis 20, as shown in FIGS. 9 and 10. The locking means holds the tiltable front frame structure 16 in a stable upright centered position, which is especially desirable when the tricycle is in a standstill condition or being driven at low road speeds when the leaning capability is not required. The novel locking means is shown in FIGS. 6 and 11.

FIGS. 6 and 11 show a bracket 19 extending downwardly from cage 45 into close proximity to horizontal tubular frame element 35 when element 35 is in its centered position. Bracket 19 has a locking notch 21 in its lower edge.

The locking means comprises a lever 23 having a transverse pivot connection 25 with frame element 35. Ears 27 on the lever extend downwardly alongside frame element 35 to accommodate the pivot connection. A locking lug 29 is formed on the upper leading edge of lever 23 to align with locking notch 21 on bracket 19 when the front frame structure 16 is in its centered position. A tension spring 31 normally biases lever 23 to a position disengaged from locking notch 21, as shown in FIG. 6.

Lever 23 can be pivoted upwardly to a locking position wherein lug 29 is seated in notch 21; a remote actuating means for this purpose comprises a manual lever 33 on the right handlebars (FIG. 2) and a Bowden wire 37 extending between lever 33 and lever 23. Manual depression of lever 33 against the handlebar exerts a pulling force on the Bowden wire. The Bowden wire swings lever 23 counter-clockwise around pivot connection 25 so that lug 29 enters notch 21. As long as lever 33 is squeezed against the handlebars the locking lug 29 will remain in notch 21 so that front frame structure 16 is maintained in a centered upright position. When manual lever 33 is released spring 31 returns lever 23 to the FIG. 6 unlocked condition.

As noted previously, the locking mechanism depicted in FIGS. 6 and 11 is advantageous in that the tricycle is maintained in a stable upright centered position suitable for easy mounting and dismounting, or movement at low speeds where the possibility of tipping over due to centrifugal forces is relatively remote.

The locking mechanism depicted in FIGS. 6 and 11 is normally unlocked, in the absence of manual pressure on manual lever 33. However, the locking mechanism could be designed as a normally-locked construction, if so desired. Such a construction could involve interchanging the relative positions of spring 31 and Bowden wire 37 on lever 23, whereby the spring would bias lever 23 to the locked position, and the Bowden wire would pull lever 23 to the unlocked condition.

Variations and modifications can be utilized in order to achieve the desired manually-operated locking means for releasably retaining the front frame structure in a neutral upright centered position.

Having described my invention, I claim:

1. A tricycle comprising:

two rear ground wheels;

a rear frame means connected to said rear ground wheels for rotary movements;

a single front ground wheel;

a front frame means that includes an upstanding head tube;

means for steering said front wheel, comprising a handlebar means and a front fork means rotatably supported by said head tube;

said front frame means comprising a horizontal frame element extending underneath said rear frame means;

hanger means swingably suspending said horizontal frame element for pivotal motion around a horizontal axis located midway between said rear ground wheels;

seat means carried by said front frame means for supporting a rider in an upright position behind said handlebar means, whereby the rider can turn the handlebars and shift his weight to swing said front frame means in order to turn the tricycle without tipping the rear frame means; and manually-operated means for releasably locking said front frame means in a neutral upright position wherein said horizontal frame element is directly below said horizontal suspension axis.

2. The tricycle of claim 1, wherein said manually-operated locking means comprises a spring means biasing said locking means to an unlocked condition.

3. The tricycle of claim 1, wherein said manually-operated locking means comprises a spring means biasing said locking means to an unlocked condition, and a manual lever swingable to momentarily move said locking means to a locked condition in opposition to said spring means.

4. The tricycle of claim 3, wherein said manual lever is located on said handlebar means.

5. The tricycle of claim 1, wherein said manually-operated locking means comprises a bracket extending from said rear frame means and lever pivotably attached to said horizontal frame element.

6. The tricycle of claim 1, wherein said manually-operated locking means comprises a bracket extending downwardly from said rear frame means, a lever pivotably attached to said horizontal frame element and spring means biasing said lever to a position disengaged from said bracket; said manually-operated locking means further comprising a Bowden wire operable to swing said lever to a locking condition engaged with said bracket.

7. The tricycle of claim 6, wherein said bracket has a downwardly-facing locking notch, and said lever has a locking lug aligned with said notch.

8. The tricycle of claim 6, wherein said horizontal frame element comprises a cylindrical tube; said lever comprising a plate overlying said cylindrical tube and two downwardly-extending ears extending from said plate alongside said cylindrical tube; said arms having pivotable connections to said tube, whereby said lever is swingably mounted for movement around a horizontal axis extending transversely through said cylindrical tube.

9. The tricycle of claim 8, wherein said Bowden wire is anchored to one of said downwardly-extending arms below said pivotable connections.

10. The tricycle of claim 1, wherein said manually-operated locking means comprises a locking bracket attached to said rear frame means and having a locking notch, a first lever pivotably attached to said horizontal frame element and having a locking lug aligned with said notch, spring means biasing said first lever to a position wherein said locking lug is disengaged from said locking notch, a second manual lever mounted on said handlebar means, and a Bowden wire extending between said first and second levers, whereby manual pressure on said second lever causes the Bowden wire to pull said first lever to a locking condition wherein said locking lug is seated in said locking notch.

* * * * *